United States Patent
Tiwari et al.

(10) Patent No.: US 10,797,938 B2
(45) Date of Patent: Oct. 6, 2020

(54) AUTOMATIC MONITORING, CORRELATION, AND RESOLUTION OF NETWORK ALARM CONDITIONS

(71) Applicant: Accenture Global Solutions Limited, Dublin (IE)

(72) Inventors: Sanjay Tiwari, Karnataka (IN); Surya Kumar Venkata Gangadhara Idumudi, Chennai (IN); Ranjana Bhalchandra Narawane, Mumbai (IN); Nithyanandan Periasamy Dhanapal, Bangalore (IN); Badarayan Panigrahi, Bengaluru (IN); Devendra Singh Dhakarey, Bengaluru (IN); Tarang Kumar, Bengaluru (IN)

(73) Assignee: Accenture Global Solutions Limited, Dublin (IE)

( * ) Notice: Subject to any disclaimer, the term of this patent is extended or adjusted under 35 U.S.C. 154(b) by 27 days.

(21) Appl. No.: 16/119,551

(22) Filed: Aug. 31, 2018

(65) Prior Publication Data
US 2019/0379577 A1 Dec. 12, 2019

(30) Foreign Application Priority Data
Jun. 8, 2018 (IN) .............................. 201841021558

(51) Int. Cl.
*H04L 12/24* (2006.01)
(52) U.S. Cl.
CPC ........ *H04L 41/0654* (2013.01); *H04L 41/069* (2013.01); *H04L 41/0645* (2013.01); *H04L 41/0677* (2013.01); *H04L 41/0686* (2013.01)

(58) Field of Classification Search
USPC ................................ 709/224, 206, 231, 220
See application file for complete search history.

(56) References Cited

U.S. PATENT DOCUMENTS

| | | | | |
|---|---|---|---|---|
| 6,611,867 B1* | 8/2003 | Bowman-Amuah | ....................... H04L 41/046 | 709/218 |
| 6,970,183 B1* | 11/2005 | Monroe | ................. G08B 7/062 | 348/143 |
| 7,107,496 B1* | 9/2006 | D'Ippolito | .......... H04L 41/0631 | 714/43 |

(Continued)

*Primary Examiner* — Jude Jean Gilles
(74) *Attorney, Agent, or Firm* — Harrity & Harrity, LLP

(57) ABSTRACT

A device receives first network information associated with a first portion of a network, and second network information associated with a second portion of the network, and determines, based on the first network information and the second network information, an alarm condition for the network. The device determines, based on correlation rules, whether the alarm condition relates to a currently handled alarm condition or a previously handled alarm condition. The device correlates the alarm condition with network inventory information, network topology information, and network service information, when the alarm condition does not relate to the currently handled alarm condition or the previously handled alarm condition, to generate a correlated alarm condition. The device automatically generates a resolution for the correlated alarm condition based on the correlated alarm condition, and automatically performs one or more actions based on the resolution for the correlated alarm condition.

20 Claims, 14 Drawing Sheets

(56) References Cited

U.S. PATENT DOCUMENTS

| | | | | |
|---|---|---|---|---|
| 8,207,845 | B2* | 6/2012 | Sharma | H04M 11/04 |
| | | | | 340/531 |
| 9,246,747 | B2* | 1/2016 | Chan | H04L 41/142 |
| 9,258,234 | B1* | 2/2016 | Addepalli | H04L 47/12 |
| 10,015,089 | B1* | 7/2018 | Gonzalez | H04L 45/74 |
| 2004/0193943 | A1* | 9/2004 | Angelino | H04L 63/1408 |
| | | | | 714/4.1 |
| 2009/0057428 | A1* | 3/2009 | Geadelmann | G05B 15/02 |
| | | | | 236/51 |
| 2012/0229271 | A1* | 9/2012 | Davis | G08B 25/004 |
| | | | | 340/539.12 |
| 2013/0145021 | A1* | 6/2013 | Sandstrom | H04L 41/06 |
| | | | | 709/224 |
| 2013/0173909 | A1* | 7/2013 | Arno | H04L 63/0428 |
| | | | | 713/153 |
| 2015/0271304 | A1* | 9/2015 | Smith | H04L 69/30 |
| | | | | 370/389 |
| 2017/0078183 | A1* | 3/2017 | Civanlar | H04L 45/64 |
| 2019/0140976 | A1* | 5/2019 | Liou | H04L 45/64 |

* cited by examiner

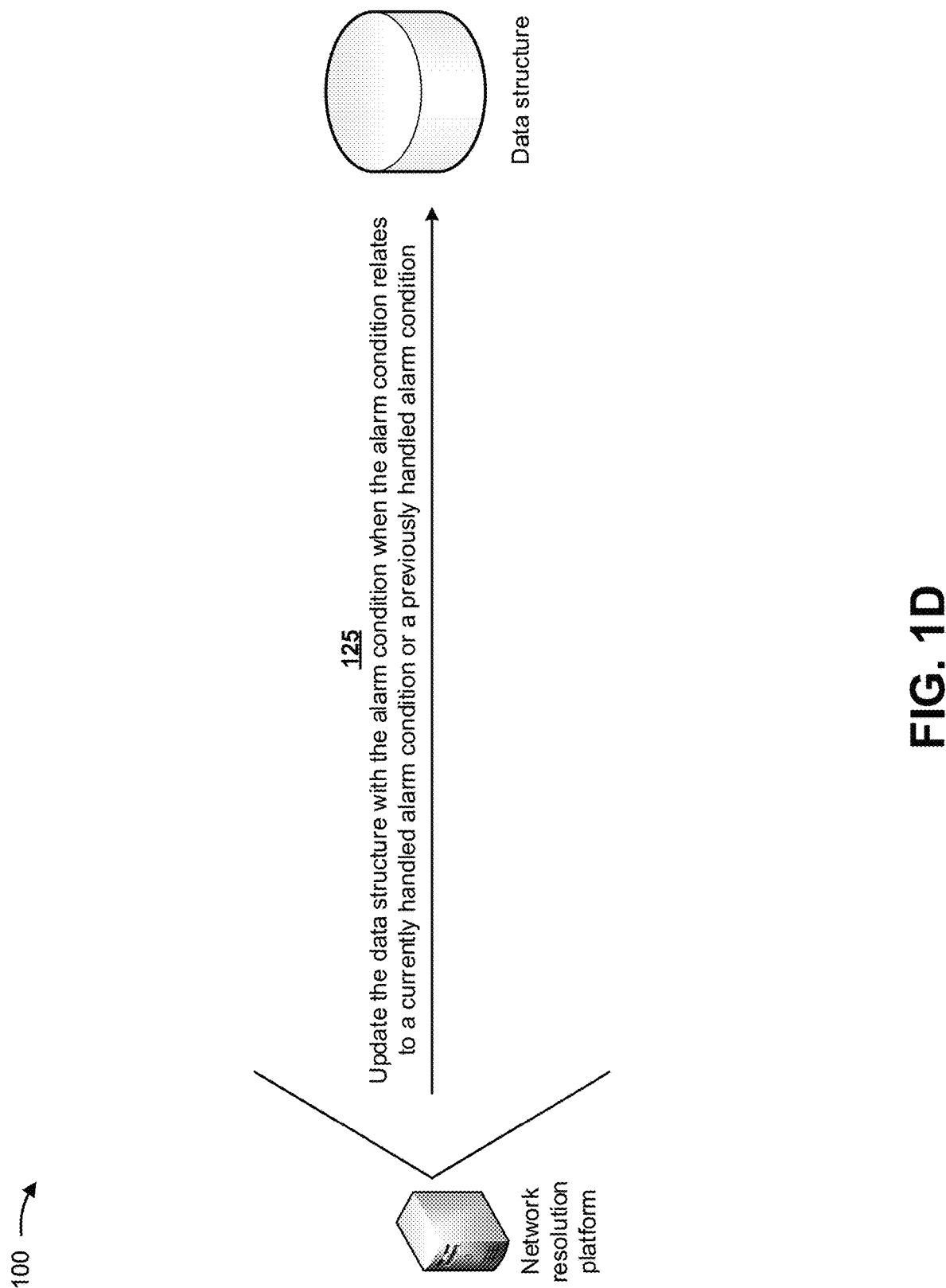

AUTOMATIC MONITORING, CORRELATION, AND RESOLUTION OF NETWORK ALARM CONDITIONS

RELATED APPLICATION

This application claims priority under 35 U.S.C. § 119 to Indian Patent Application No. 201841021558, filed on Jun. 8, 2018, the content of which is incorporated by reference herein in its entirety.

BACKGROUND

Today's emerging technologies, such as immersive audio-video applications or Internet of Things (IoT) technologies are providing a much smarter and a fully-connected world. Such technologies provide unprecedented opportunities to the mobile industry. Technology innovations, such as fifth-generation (5G) telecommunications networks, are accelerating the pace towards a better-connected world. For example, the near future may provide new experiences and applications in various technologies, such as autonomous vehicles, remote surgery, virtual reality, and virtual reality-based immersive entertainment, and/or the like.

SUMMARY

According to some implementations, a method may include receiving first network information associated with a first portion of a network, and receiving second network information associated with a second portion of the network that is different than the first portion of the network. The method may include determining, based on the first network information and the second network information, an alarm condition for the network, and determining, based on correlation rules, whether the alarm condition relates to a currently handled alarm condition or a previously handled alarm condition. The method may include processing the alarm condition, network inventory information, network topology information, and network service information, with a machine learning model and when the alarm condition does not relate to the currently handled alarm condition or the previously handled alarm condition, to correlate the alarm condition with the network inventory information, the network topology information, and the network service information, wherein correlating the alarm condition, with the network inventory information, the network topology information, and the network service information, may generate a correlated alarm condition. The method may include automatically generating a resolution for the correlated alarm condition based on correlating the alarm condition with the network inventory information, the network topology information, and the network service information, and automatically performing, by the device, one or more actions based on the resolution for the correlated alarm condition.

According to some implementations, a device may include one or more memories, and one or more processors, communicatively coupled to the one or more memories, to receive first network information associated with a first portion of a network, wherein the first network information may include information associated with faults detected in the first portion of the network, key performance indicators associated with the first portion of the network, or alerts received from the first portion of the network. The one or more processors may receive second network information associated with a second portion of the network that is different than the first portion of the network, wherein the second network information may include information associated with faults detected in the second portion of the network, key performance indicators associated with the second portion of the network, or alerts received from the second portion of the network. The one or more processors may determine, based on the first network information and the second network information provide, a single alarm condition associated with the network, and may determine, based on one or more correlation rules, whether the single alarm condition relates to a currently handled alarm condition or a previously handled alarm condition. The one or more processors may correlate, when the single alarm condition does not relate to the currently handled alarm condition or the previously handled alarm condition, the single alarm condition with network inventory information, network topology information, and network service information to generate a correlated alarm condition. The one or more processors may automatically generate a resolution for the correlated alarm condition based on correlating the single alarm condition with the network inventory information, the network topology information, and the network service information, and may automatically perform one or more actions based on the resolution for the correlated alarm condition.

According to some implementations, a non-transitory computer-readable medium may store instructions that include one or more instructions that, when executed by one or more processors of a device, cause the one or more processors to receive first network information associated with a first portion of a network, and receive second network information associated with a second portion of the network that is different than the first portion of the network. The one or more instructions may cause the one or more processors to determine, based on the first network information and the second network information, an alarm condition for the network, and process the alarm condition, network inventory information, network topology information, and network service information, with a machine learning model, to correlate the alarm condition with the network inventory information, the network topology information, and the network service information, wherein correlating the alarm condition, with the network inventory information, the network topology information, and the network service information, may generate a correlated alarm condition. The one or more instructions may cause the one or more processors to process network customer information and the correlated alarm condition, with another machine learning model, to determine an impact of the correlated alarm condition on network customers. The one or more instructions may cause the one or more processors to automatically generate a resolution for the correlated alarm condition based on correlating the alarm condition, with the network inventory information, the network topology information, and the network service information, and based on the impact of the correlated alarm condition on the network customers, and automatically perform one or more actions based on the resolution for the correlated alarm condition.

BRIEF DESCRIPTION OF THE DRAWINGS

FIGS. 1A-1I are diagrams of an overview of an example implementation described herein;

DETAILED DESCRIPTION

Figure 1A:
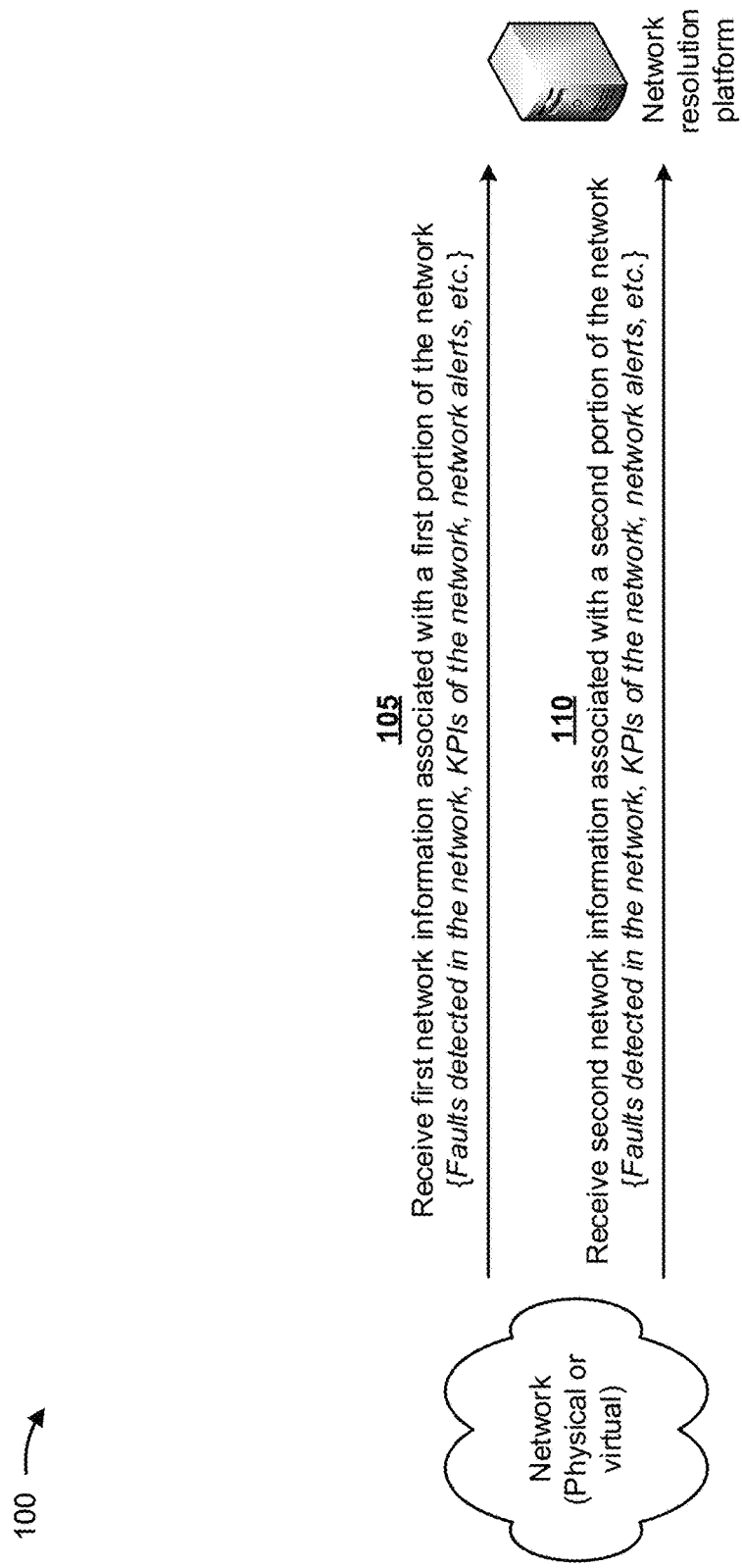

The following detailed description of example implementations refers to the accompanying drawings. The same reference numbers in different drawings may identify the same or similar elements.

A network operations center is a central location from which network administrators manage, control, and monitor one or more networks. A network operations center helps network providers effectively manage networks and services associated with the networks. Currently, a network operation center utilizes separate systems to handle network fault monitoring, network performance monitoring, network configurations, field installation and repair, and incident management, and requires significant human management. Furthermore, monitoring a performance of an increasingly virtualized network is likely to become dramatically more complicated, since a virtualized network includes more than devices with a fixed, physical network presence. Virtual services provided by virtual networks will constantly change as such services are set up and torn down on-demand, and dynamically routed and controlled.

Some implementations described herein provide a network resolution platform that automatically monitors, correlates, and resolves network alarm conditions. For example, the network resolution platform may receive first network information associated with a first portion of a network and second network information associated with a second portion of the network, and may determine, based on the first network information and the second network information, an alarm condition for the network. The network resolution platform may determine, based on correlation rules, whether the alarm condition relates to a currently handled alarm condition or a previously handled alarm condition. The network resolution platform may correlate the alarm condition with network inventory information, network topology information, and network service information, when the alarm condition does not relate to the currently handled alarm condition or the previously handled alarm condition, to generate a correlated alarm condition. The network resolution platform may automatically generate a resolution for the correlated alarm condition based on the correlated alarm condition, and may automatically performs one or more actions based on the resolution for the correlated alarm condition.

In this way, the network resolution platform may predict vulnerability in a network, may provide a holistic view of network health, and may improve network customer experience. The network resolution platform may monitor network performance and network function parameters of a network, and may automatically scale-in or scale-out a network resource required for a particular service of a network. The network resolution platform may incorporate cross network domain correlation to reduce service impacting incidents, and may provide a customer service experience analysis, a customer impact analysis, network traffic monitoring, network usage parameters, network quality of service (QoS) parameters, and/or the like. The network resolution platform may reengineer network processes, and may provide predictive and proactive network assurance.

FIGS. 1A-1I are diagrams of an overview of an example implementation 100 described herein. As shown in FIGS. 1A-1I, a user device may be associated with a user, a network, and a network resolution platform. As further shown in FIG. 1A, and by reference number 105, the network resolution platform may receive first network information associated a first portion of the network. In some implementations, the first portion of the network may include a physical network portion that includes physical network devices (e.g., base stations, routers, gateways, servers, and/or the like). In some implementations, the first network information may include information indicating faults detected in the first portion of network, key performance indicators (KPIs) associated with the first portion of the network (e.g., average active network users, average network throughput download, average network throughput upload, network availability, upload traffic volume, and/or the like), network alerts associated with the first portion of the network, and/or the like.

As further shown in FIG. 1A, and by reference number 110, the network resolution platform may receive second network information associated a second portion of the network. In some implementations, the second portion of the network may include a virtual network portion that includes virtual network entities (e.g., virtual machines, hypervisors, and/or the like). In some implementations, the second network information may include information indicating faults detected in the second portion of network, KPIs associated with the second portion of the network (e.g., average active network users, average network throughput download, average network throughput upload, network availability, upload traffic volume, and/or the like), network alerts associated with the second portion of the network, and/or the like.

In some implementations, the network may include a physical network. In such implementations, the first portion of the network may include one of an access network portion (e.g., a random access network or RAN) of the network, a core portion (e.g., an evolved packet core network) of the network, a transport portion (e.g., an optical transport network) of the network, and/or the like, and the second portion of the network may include another one of the access network portion of the network, the core portion of the network, the transport portion of the network, and/or the like.

In some implementations, the network may include a virtual network. In such implementations, the first portion of the network may include one of a virtual machine portion of the network, a hypervisor portion of the network, a virtual storage portion of the network, and/or the like, and the second portion of the network may include another one of the virtual machine portion of the network, the hypervisor portion of the network, the virtual storage portion of the network, and/or the like.

Figure 1B:
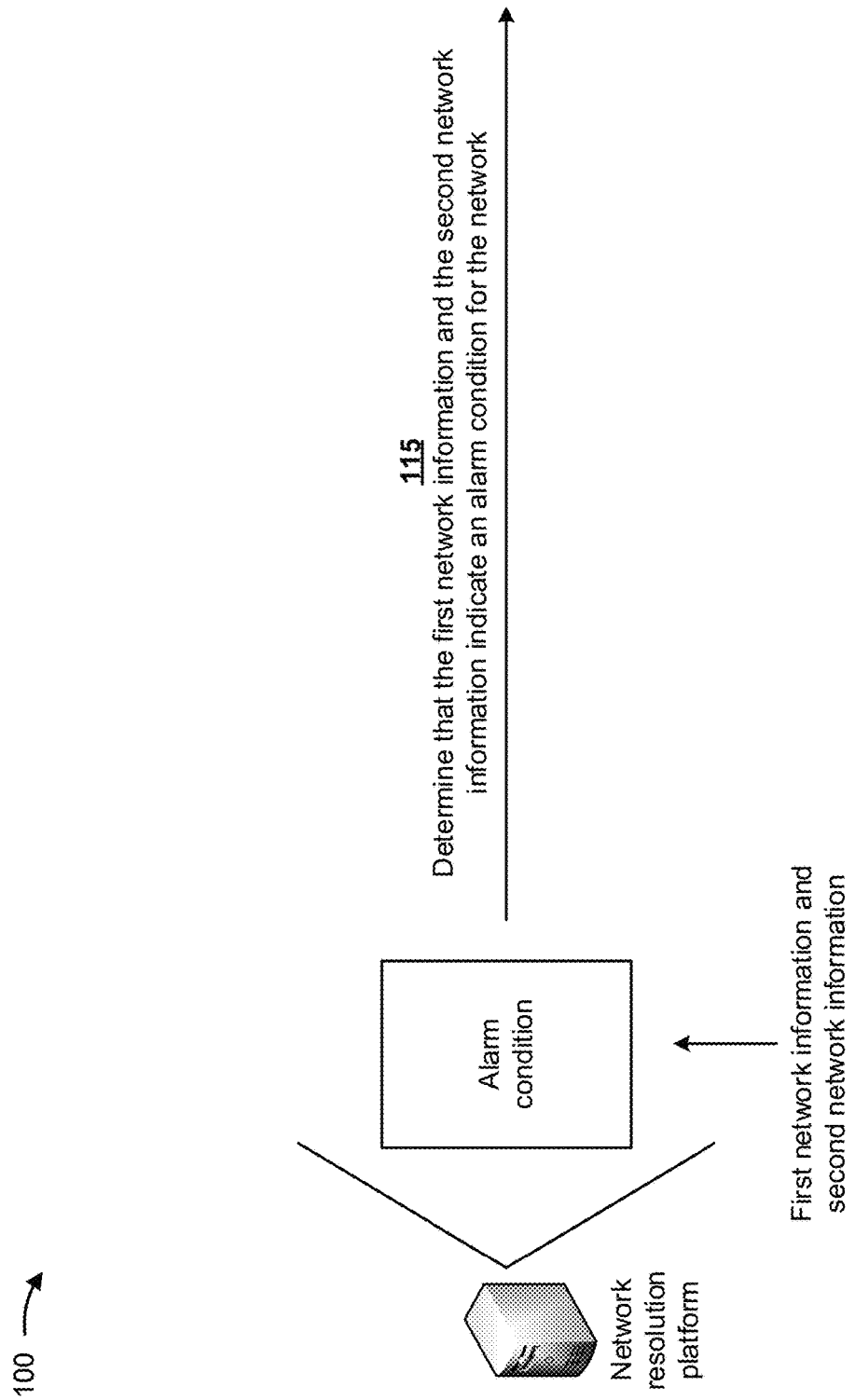

As shown in FIG. 1B, and by reference number 115, the network resolution platform may determine that the first network information and the second network information indicate an alarm condition for the network. In some implementations, the alarm condition may be the same alarm condition but may affect different portions of the network as indicated by the first network information and the second network information. For example, if the first network information indicates that a network device is not functioning correctly (e.g., is not processing traffic, is corrupting the traffic, and/or the like), the malfunctioning network device may affect the second portion of the network, as indicated by the second network information. For example, the second network information may indicate that traffic received from the malfunctioning network device, by a virtual machine, is causing the virtual machine to function incorrectly.

In some implementations, the alarm condition may indicate faults in one or more network devices of the first portion of the network, alerts generated by one or more network devices of the first portion of the network, faults in one or more virtual machines of the second portion of the network, alerts generated by one or more virtual machines of the second portion of the network, faults in one or more hypervisors of the second portion of the network, alerts generated by one or more hypervisors of the second portion of the network, and/or the like.

In some implementations, the network resolution platform may process the first network information and the second network information, with a model (e.g., a machine learning model), to determine that the first network information and the second network information indicate an alarm condition for the network. In some implementations, the machine learning model may include a hidden Markov model, a support vector machine model, a fault classification model, and/or the like. In some implementations, the network resolution platform may utilize more than one machine learning model to determine the alarm condition.

In some implementations, the network resolution platform may perform a training operation on the machine learning model with historical network information (e.g., historical information that includes historical alarm conditions). For example, the network resolution platform may separate the historical network information into a training set, a validation set, a test set, and/or the like. In some implementations, the network resolution platform may train the machine learning model using, for example, an unsupervised training procedure and based on the training set of the historical network information. For example, the network resolution platform may perform dimensionality reduction to reduce the historical network information to a minimum feature set, thereby reducing resources (e.g., processing resources, memory resources, and/or the like) to train the machine learning model, and may apply a classification technique, to the minimum feature set.

In some implementations, the network resolution platform may use a logistic regression classification technique to determine a categorical outcome (e.g., that the historical network information includes alarm conditions). Additionally, or alternatively, the network resolution platform may use a naïve Bayesian classifier technique. In this case, the network resolution platform may perform binary recursive partitioning to split the historical network information into partitions and/or branches, and use the partitions and/or branches to perform predictions (e.g., that the historical network information include alarm conditions). Based on using recursive partitioning, the network resolution platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the network resolution platform may use a support vector machine (SVM) classifier technique to generate a non-linear boundary between data points in the training set. In this case, the non-linear boundary is used to classify test data into a particular class.

Additionally, or alternatively, the network resolution platform may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the network resolution platform may use one or more other model training techniques, such as a neural network technique, a latent semantic indexing technique, and/or the like. For example, the network resolution platform may perform an artificial neural network processing technique (e.g., using a two-layer feedforward neural network architecture, a three-layer feedforward neural network architecture, and/or the like) to perform pattern recognition with regard to alarm conditions of the historical network information. In this case, using the artificial neural network processing technique may improve an accuracy of the trained machine learning model generated by the network resolution platform by being more robust to noisy, imprecise, or incomplete data, and by enabling the network resolution platform to detect patterns and/or trends undetectable to human analysts or systems using less complex techniques.

Figure 1C:
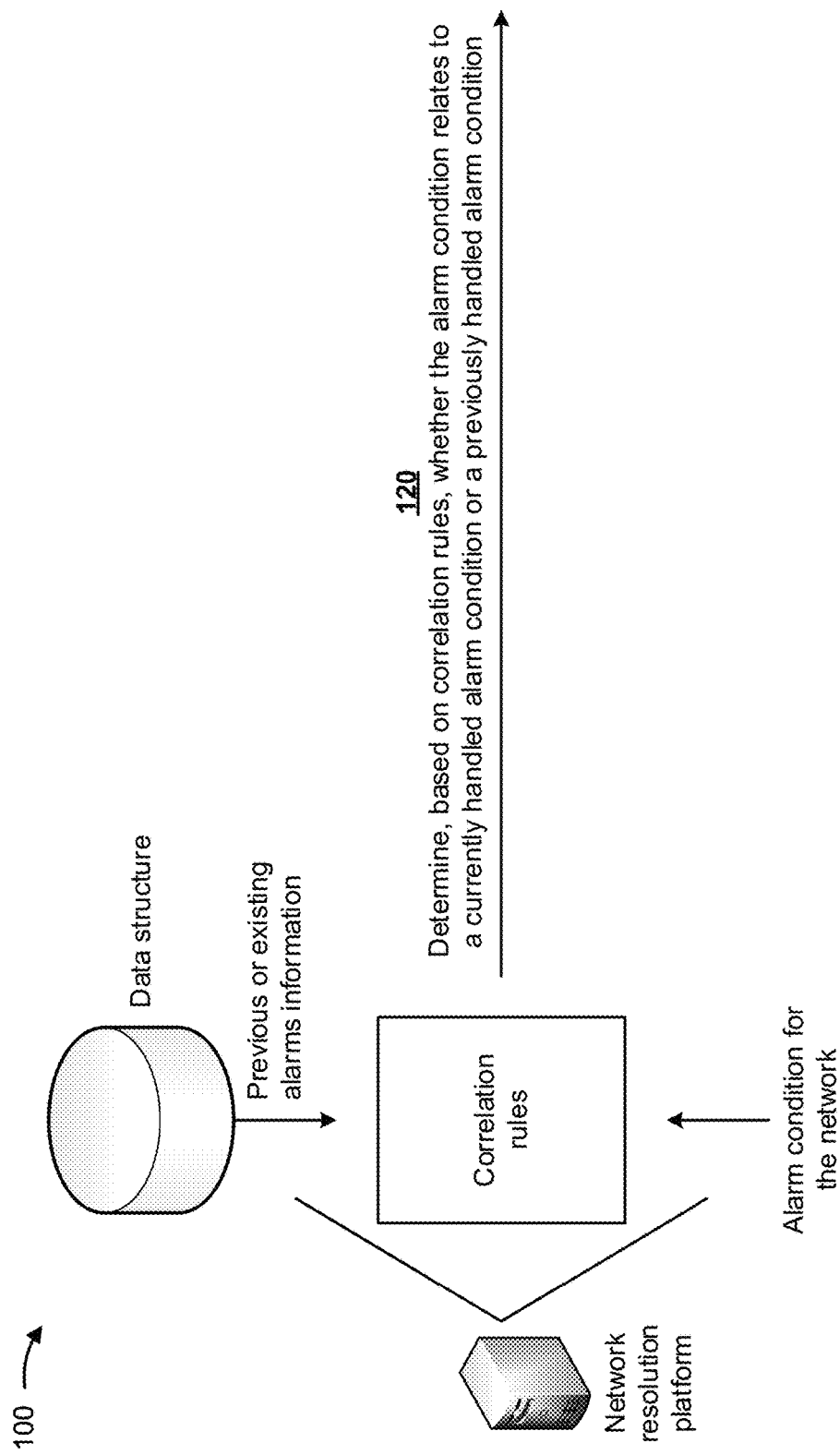

As shown in FIG. 1C, and by reference number 120, the network resolution platform may determine, based on correlation rules, whether the alarm condition relates to a currently handled alarm condition or a previously handled alarm condition. In some implementations, the network resolution platform may store information associated with previous or existing alarm conditions, information associated with how the previous or existing alarm conditions were handled or are being handled, and/or the like. The network resolution platform may utilize such information to determine whether the alarm condition has been previously detected and/or previously resolved. In some implementations, if the alarm condition was previously resolved, the network resolution platform may utilize the information from the data structure to resolved alarm condition in the same manner. In some implementations, if the alarm condition is currently being handled, the network resolution platform may utilize the additional information provided by the first network information and the second network information to resolve the alarm condition. In this way, the network resolution platform may avoid handling duplicate alarm conditions at the same time, which may conserve computing resources (e.g., processing resources, memory resources, and/or the like).

In some implementations, the correlation rules may include rules that analyze relationships between network events indicated in the first network information, the second network information, and the information stored in the data structure. If a quantity of network events is indicated in the first network information, the second network information, and the information stored in the data structure, the network resolution platform may determine whether the quantity of network events satisfies a threshold quantity. When the quantity of network events satisfies the threshold quantity, the network resolution platform may determine that the alarm condition matches or relates to a currently handled alarm condition or a previously handled alarm condition. When the quantity of network events fails to satisfy the threshold quantity, the network resolution platform may determine that the alarm condition is new alarm condition since the alarm condition does not match or relate to a currently handled alarm condition or a previously handled alarm condition.

For example, if the currently handled alarm condition relates to a faulty interface of a network device, the first network information indicates that the network device is not sending or receiving traffic, and the second network information indicates that a virtual machine is not receiving traffic from the network device, the network resolution platform may determine that the currently handled alarm condition (e.g., the faulty interface) relates to the alarm condition (e.g., the faulty network device and the faulty virtual machine).

As shown in FIG. 1D, and by reference number 125, the network resolution platform may update the data structure with the alarm condition when the alarm condition relates to a currently handled alarm condition or a previously handled alarm condition. In some implementations, the network resolution platform may update the data structure with the first network information and/or the second network information by associating this information with information associated with the currently handled alarm condition or the previously handled alarm condition. In some implementations, the network resolution platform may utilize the additional information provided by the first network information and the second network information to resolve the currently handled alarm condition or the previously handled alarm condition (e.g., which, in turn, should resolve the alarm condition).

Figure 1E:
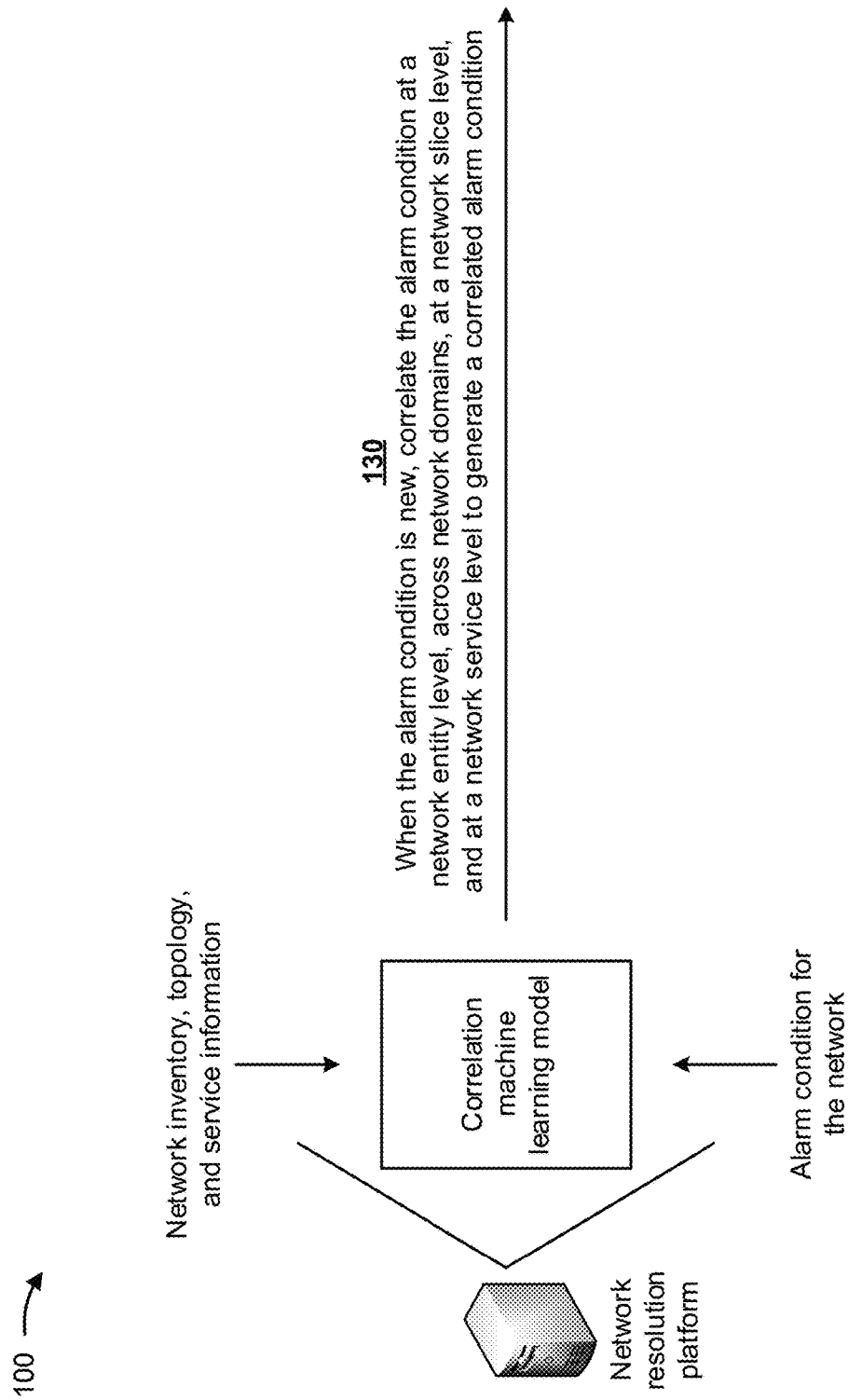

As shown in FIG. 1E, and by reference number 130, when the alarm condition is new (i.e., the alarm condition is not associated with a currently handled alarm condition or a previously handled alarm condition), the network resolution platform may correlate the alarm condition at a network entity (e.g., a network device) level, across network domains (e.g., across an access network portion, a core portion, a transport portion, and/or the like of the network), at a network slice level (e.g., network slices provided by a fifth generation (5G) network), and at a network service level (e.g., services offered by the network) to generate a correlated alarm condition. In some implementations, the correlated alarm condition may include information indicating the alarm condition and events occurring in network entities, across network domains, in network slices, and in network services that are correlated with (e.g., attributable to) the alarm condition. For example, if the alarm condition relates to an unresponsive virtual machine, the correlated alarm condition may include information identifying the unresponsive virtual machine, how a network device is not receiving services from the unresponsive virtual machine, how an access network cannot communicate with the unresponsive virtual machine, how a network service cannot be provided because of the unresponsive virtual machine, and/or the like.

In some implementations, the network resolution platform may process the alarm condition, network inventory information, network topology information, and network service information, with a model (e.g., a machine learning model), to correlate the alarm condition with the network inventory information, the network topology information, and the network service information, and to generate the correlated alarm condition. In some implementations, the network inventory information may include information identifying network devices (e.g., types of network devices, serial number of the network devices, and/or the like) of the network, capabilities of the network devices (e.g., throughput, storage, interfaces, and/or the like), links between the network devices, virtual machines of the network, hypervisors of the network, and/or the like. In some implementations, the network topology information may include information identifying placement of network devices of the network (e.g., network device locations, link location, and/or the like), data flows within the network, distances between network devices, physical interconnections between network devices, transmission rates of network devices, signal types of network devices, and/or the like. The network service information may include information identifying services offered by the network, features of services, network devices associated with the services, virtual machines associated with the services, and/or the like.

In some implementations, the machine learning model may include a hidden Markov model, a support vector machine model, a fault classification model, and/or the like. In some implementations, the network resolution platform may utilize more than one machine learning model to generate the correlated alarm condition. In some implementations, the network resolution platform may perform a training operation on the machine learning model with historical network inventory information, network topology information, network service information, and alarm conditions, as described above.

Figure 1F:
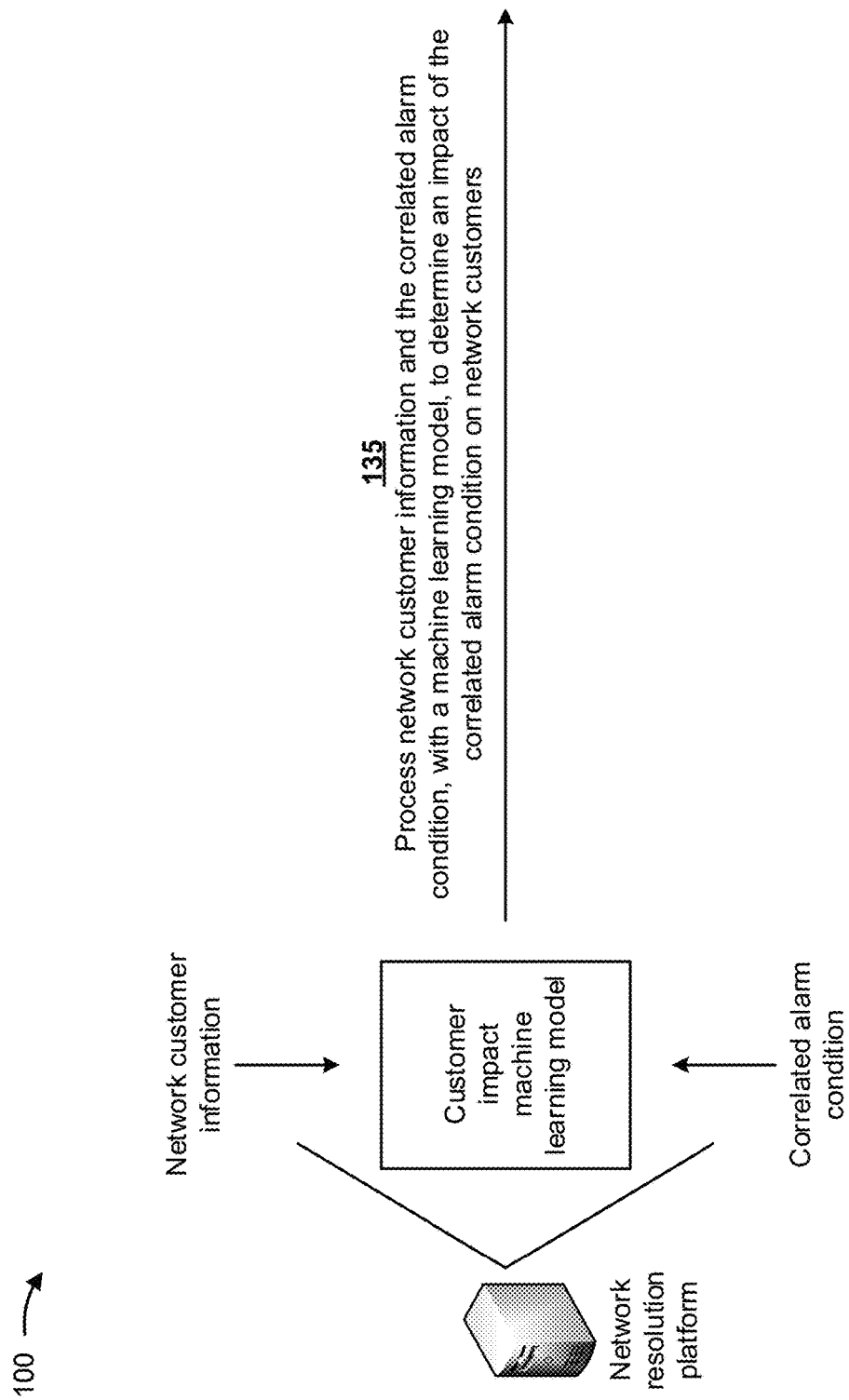

As shown in FIG. 1F, and by reference number 135, the network resolution platform may process network customer information and the correlated alarm condition, with a machine learning model, to determine an impact of the correlated alarm condition on network customers. In some implementations, the network customer information may include information identifying customers of the network, devices utilized by the customers, network usage rates of the customers, network service utilized by the customers, network devices utilized by the customers, virtual machines utilized by the customers, and/or the like. In some implementations, the impact of the correlated alarm condition on the network customers may include information identifying a degraded user experience for the network customers caused by the correlated alarm condition, service failures for the network customers caused by the correlated alarm condition, network outages for the network customers caused by the correlated alarm condition, and/or the like.

In some implementations, the machine learning model may include a logistic regression mode, a boosted decision tree model, an averaged perceptron model, a support vector machine model, and/or the like. In some implementations, the network resolution platform may utilize more than one machine learning model to determine the impact of the correlated alarm condition on the network customers. In some implementations, the network resolution platform may perform a training operation on the machine learning model with historical network customer information and alarm conditions, as described above.

Figure 1G:
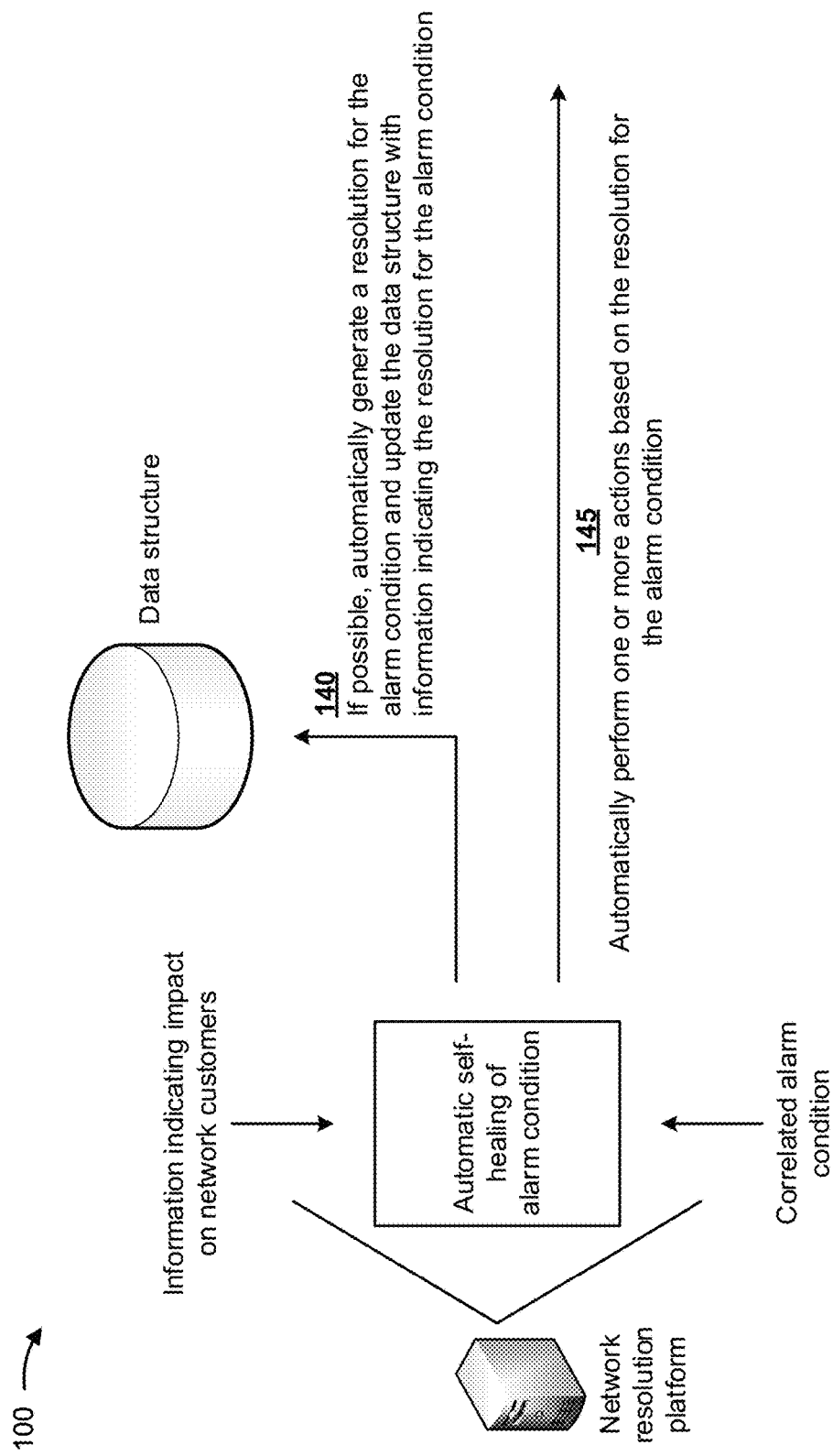

As shown in FIG. 1G, and by reference number 140, the network resolution platform may automatically generate a resolution for the alarm condition and may update the data structure with information indicating the resolution for the alarm condition. In some implementations, the network resolution platform may automatically generate the resolution for the alarm condition based on the correlated alarm condition (e.g., based on correlating the alarm condition with the network inventory information, the network topology information, and the network service information) and based on information indicating the impact of the correlated alarm on the network customers.

In some implementations, the network resolution platform may process information indicating the correlated alarm condition and information indicating the impact of the correlated alarm condition on the network customers, with a machine learning model, to generate the resolution for the alarm condition. In some implementations, the machine learning model may compare the alarm condition to historical alarm conditions, and may identify one or more historical alarm conditions that are similar the alarm condition. Based on identifying the one or more historical alarm conditions, the machine learning model may determine one or more historical resolutions associated with the one or more historical alarm conditions. The machine learning model may utilize one or more of the one or more historical resolutions to generate the resolution for the alarm condition.

For example, if the alarm condition relates to a failing network device interface, the machine learning model may identify historical alarm conditions that relate to interface failures for the same network device or similar network devices. The machine learning model may determine the historical interface failures were resolved by powering off and powering on network devices, replacing the failing interfaces, diverting traffic away from the failing interfaces, and/or the like. Based on such resolutions, the machine learning model may suggest a resolution of powering off and powering on the network device, and, if that is not successful, diverting traffic away from the failing network device interface.

In some implementations, the machine learning model may include a hidden Markov model, a support vector machine model, a fault classification model, and/or the like. In some implementations, the network resolution platform may utilize more than one machine learning model to determine the impact of the correlated alarm condition on the network customers. In some implementations, the network resolution platform may perform a training operation on the machine learning model with historical alarm conditions and resolutions, as described above.

As further shown in FIG. 1G, and by reference number 145, the network resolution platform may automatically perform one or more actions based on the resolution for the alarm condition. In some implementations, the one or more actions may include causing a network device of the network to perform differently. For example, if the network device is analyzing traffic and the analysis is slowing throughput of the network device, the network resolution platform may cause the network device to stop analyzing the traffic, to analyze less traffic, and/or the like. In this way, the network resolution platform may increase the throughput of the network device.

In some implementations, the one or more actions may include causing a change to a network interface of the network. For example, if a network interface is providing traffic to a network device and overloading the network device, the network resolution platform may cause the network interface to send the traffic to another network device, to offload a portion of the traffic to the other network device, and/or the like. In this way, the network resolution platform may prevent overloading of the network device and a potential network outage.

In some implementations, the one or more actions may include causing a virtual network entity to perform differently. For example, if a virtual machine is performing a security check on traffic and is preventing all traffic from being forwarded, the network resolution platform may update security rules of the virtual machine so that not all traffic is prevented from being forwarded. In this way, the network resolution platform may ensure network security and may prevent a bottleneck in the network.

In some implementations, the one or more actions may include causing a virtual network entity to be replaced with another virtual network entity. For example, if a virtual machine is providing a data processing service that is outdated, the network resolution platform may replace the virtual machine with another virtual machine that provides a new data processing service. In this way, the network resolution platform may provide desired services to customers.

In some implementations, the one or more actions may include causing routing through the network to change. For example, if traffic is routed to a first network device but may be more efficiently routed to a second network device, the network resolution platform may cause the traffic routed from the first network device to be re-routed to the second network device. In this way, the network resolution platform may increase traffic throughput and make the network more efficient.

In some implementations, the one or more actions may include reconfiguring one or more network devices of the network. For example, if a network device is configured to communicate with a virtual machine that provides an outdated service, the network resolution platform may reconfigure the network device to communicate with a virtual machine that provides an updated service. In this way, the network resolution platform may provide more efficient services for customers.

In some implementations, the one or more actions may include causing a network device to power up or power down. For example, if a network device is not functioning properly, the network resolution platform may cause the network device to power up or power down in hopes of causing the network device to function properly. In this way, the network resolution platform may ensure that network devices are functioning properly.

In some implementations, the one or more actions may include causing a backup network device of the network to take over for a primary network device of the network. For example, if a primary network device goes offline, the network resolution platform may cause a backup network device to assume the functions of the primary network device. In this way, the network resolution platform may avoid network outages.

In some implementations, the one or more actions may include causing a network technician to be dispatched to address an issue. For example, the network resolution platform may cause a message (e.g., an email message, a text message, a telephone message, and/or the like), indicating an issue in the network, to be provided to the technician. The technician may receive the message and may address the issue in the network. In this way, the network resolution platform may ensure that issues are properly addressed even when the network resolution platform cannot automatically the issues.

In some implementations, the one or more actions may include causing a network device of the network to be replaced. For example, if a network device is non-operational, the network resolution platform may designate another network device to assume the functions of the non-operational network device. In this way, the network resolution platform may avoid network outages.

In some implementations, the one or more actions may include causing an order for a network device to be placed to replace a failing network device or a network that is predicted to fail. For example, if a network device is failing or is predicted to fail, the network resolution platform may cause an order to be placed for a new network device so that the failing network device may be replaced. In this way, the network resolution platform may avoid network outages.

Figure 1H:
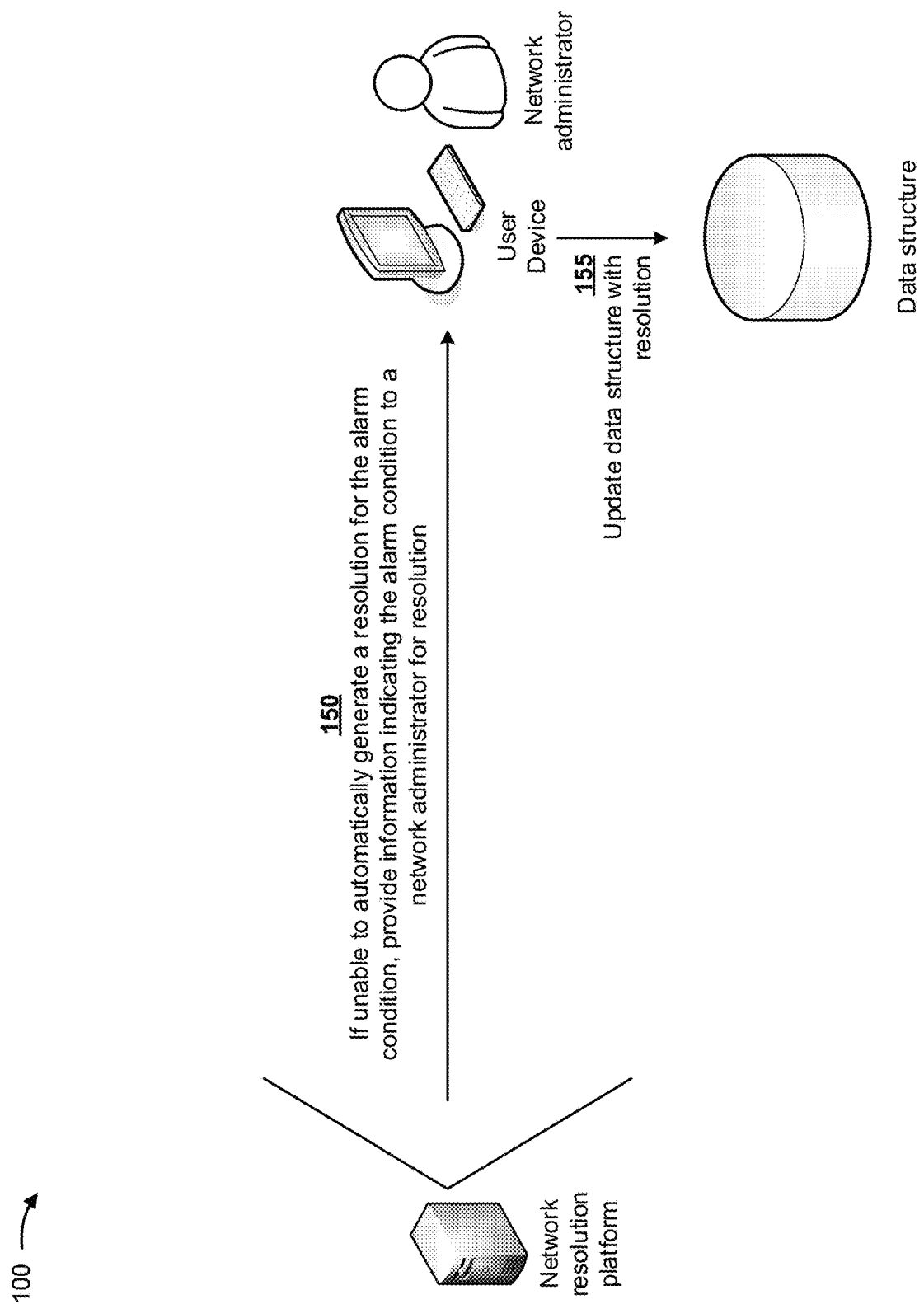

As shown in FIG. 1H, and by reference number 150, if the network resolution platform is unable to automatically generate a resolution for the alarm condition, the network resolution platform may provide, to a user device associated with a network administrator, information indicating the alarm condition. In some implementations, the network resolution platform may provide recommended courses of action to address the alarm condition. In some implementations, the network administrator may utilize the user device to review the alarm condition and any recommended courses of action, and may resolve the alarm condition. In some implementations and shown by reference number 155 in FIG. 1H, after resolving the alarm condition, the network administrator may utilize the user device to update the data structure with information identifying the resolution of the alarm condition.

Figure 1I:
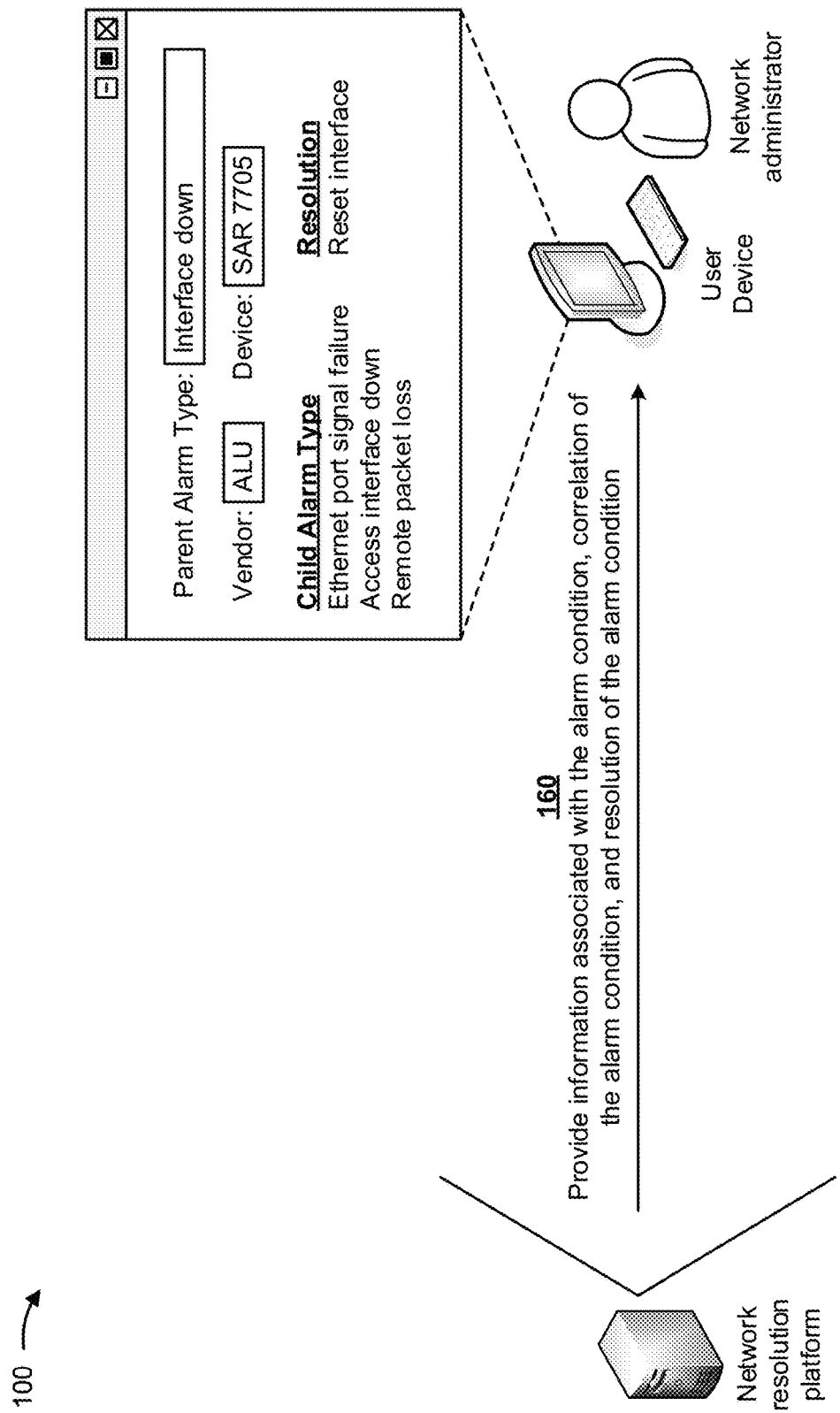

As shown in FIG. 1I, and by reference number 160, the network resolution platform may provide, to the user device associated with the network administrator, information associated with the alarm condition, the correlation of the alarm condition, resolution of the alarm condition, and/or the like. In some implementations, the network administrator may utilize the user device to review the information associated with the alarm condition, the correlation of the alarm condition, resolution of the alarm condition, and/or the like.

In this way, several different stages of the process for monitoring, correlating, and resolving network alarm conditions are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that automatically monitors, correlates, and resolves network alarm conditions. Finally, automating the process for monitoring, correlating, and resolving network alarm conditions conserves computing resources (e.g., processing resources, memory resources, and/or the like) that would otherwise be wasted in attempting to monitor, correlate, and resolve network alarm conditions.

As indicated above, FIGS. 1A-1I are provided merely as examples. Other examples are possible and may differ from what was described with regard to FIGS. 1A-1I.

Figure 2:
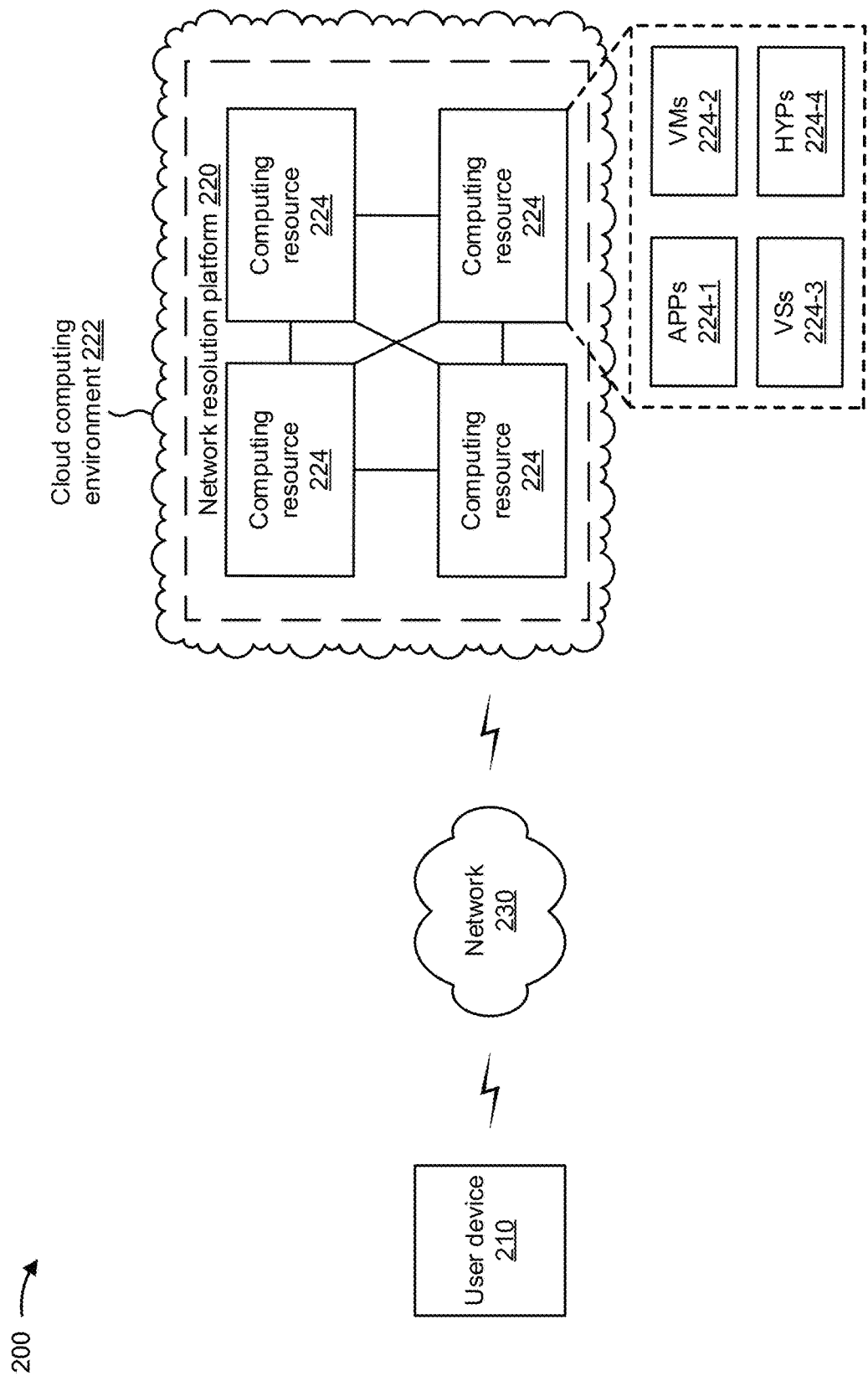
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a network resolution platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, user device 210 may receive information from and/or transmit information to network resolution platform 220.

Network resolution platform 220 includes one or more devices that automatically monitor, correlate, and resolve network alarm conditions. In some implementations, network resolution platform 220 may be designed to be modular such that certain software components may be swapped in or out depending on a particular need. As such, network resolution platform 220 may be easily and/or quickly reconfigured for different uses. In some implementations, network resolution platform 220 may receive information from and/or transmit information to one or more user devices 210.

In some implementations, as shown, network resolution platform 220 may be hosted in a cloud computing environment 222. Notably, while implementations described herein describe network resolution platform 220 as being hosted in cloud computing environment 222, in some implementations, network resolution platform 220 may not be cloud-based (i.e., may be implemented outside of a cloud computing environment) or may be partially cloud-based.

Cloud computing environment 222 includes an environment that hosts network resolution platform 220. Cloud computing environment 222 may provide computation, software, data access, storage, etc. services that do not require end-user knowledge of a physical location and configuration of system(s) and/or device(s) that hosts network resolution platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host network resolution platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with network resolution platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of network resolution platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
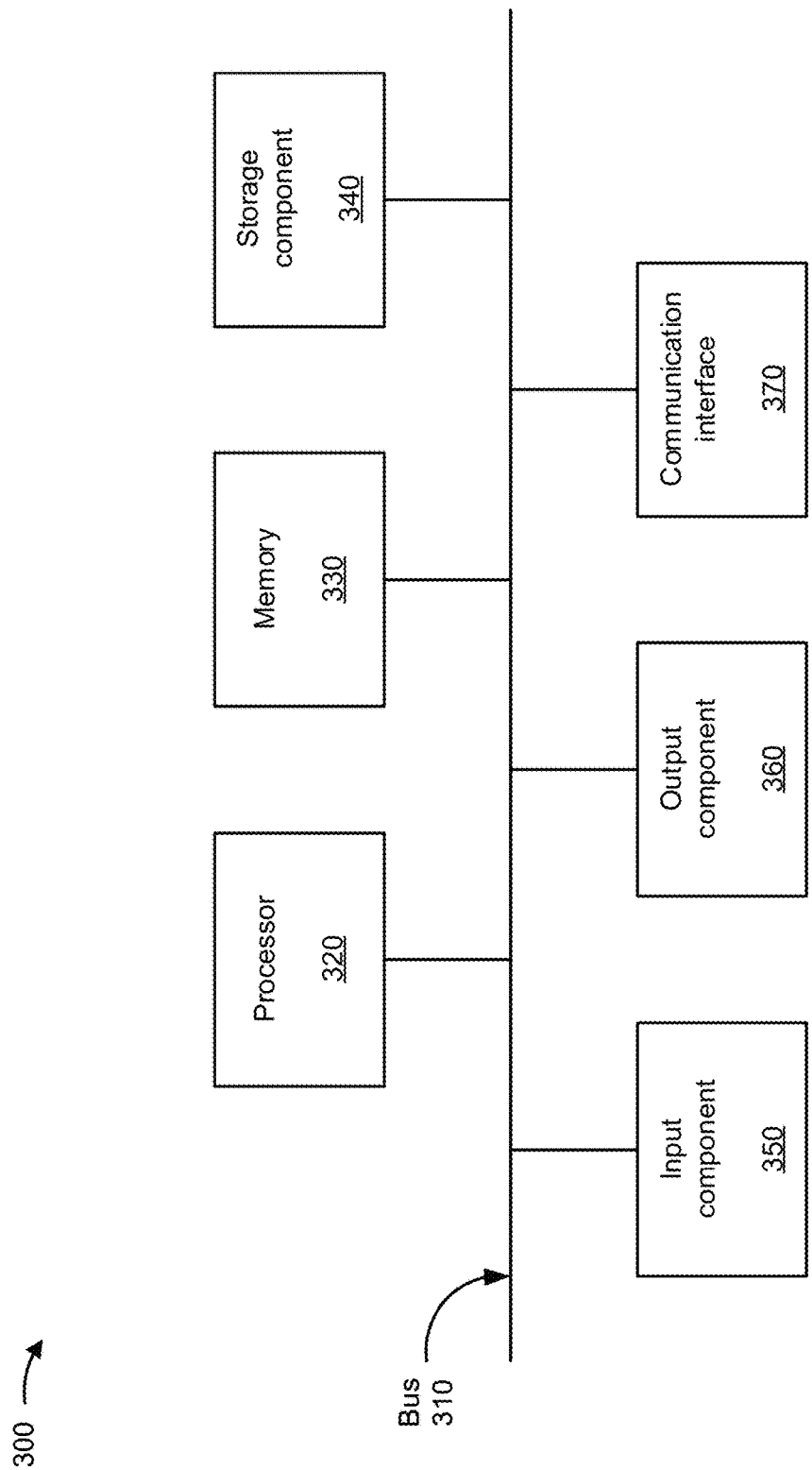
FIG. 3 is a diagram of example components of one or more devices of FIG. 2.

FIG. 3 is a diagram of example components of a device 300. Device 300 may correspond to user device 210, network resolution platform 220, and/or computing resource 224. In some implementations, user device 210, network resolution platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
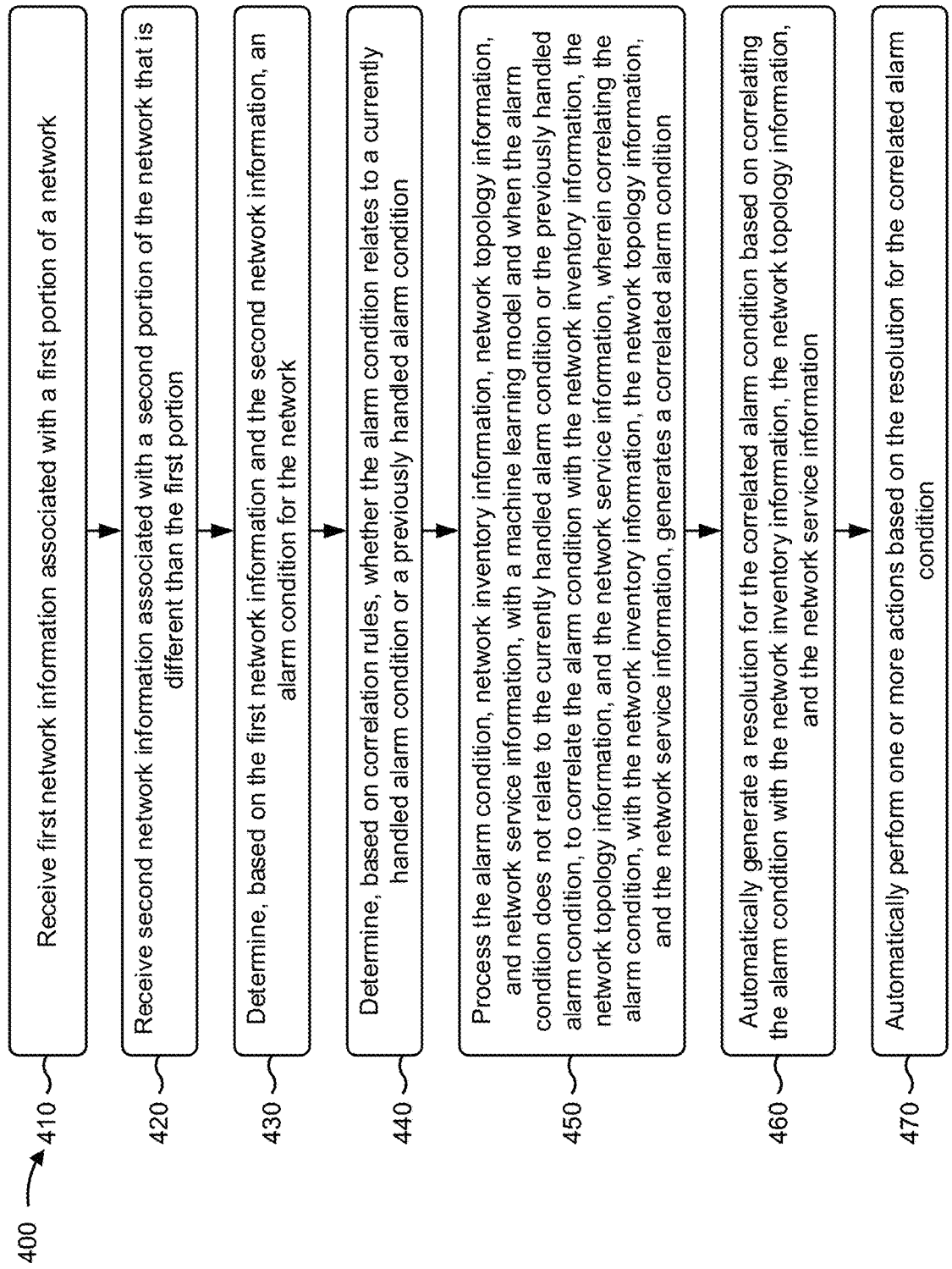
FIGS. 4-6 are flow charts of example processes for automatic monitoring, correlation, and resolution of network alarm conditions.

FIG. 4 is a flow chart of an example process 400 for automatic monitoring, correlation, and resolution of network alarm conditions. In some implementations, one or more process blocks of FIG. 4 may be performed by a network resolution platform (e.g., network resolution platform 220). In some implementations, one or more process blocks of FIG. 4 may be performed by another device or a group of devices separate from or including the network resolution platform, such as a user device (e.g., user device 210).

As shown in FIG. 4, process 400 may include receiving first network information associated with a first portion of a network (block 410). For example, the network resolution platform (e.g., using computing resource 224, processor 320, communication interface 370, and/or the like) may receive first network information associated with a first portion of a network, as described above in connection with FIGS. 1A-2.

As further shown in FIG. 4, process 400 may include receiving second network information associated with a second portion of the network that is different than the first portion of the network (block 420). For example, the network resolution platform (e.g., using computing resource 224, processor 320, communication interface 370, and/or the like) may receive second network information associated with a second portion of the network that is different than the first portion of the network, as described above in connection with FIGS. 1A-2.

As further shown in FIG. 4, process 400 may include determining, based on the first network information and the second network information, an alarm condition for the network (block 430). For example, the network resolution platform (e.g., using computing resource 224, processor 320, storage component 340, and/or the like) may determine, based on the first network information and the second network information, an alarm condition for the network, as described above in connection with FIGS. 1A-2.

As further shown in FIG. 4, process 400 may include determining, based on correlation rules, whether the alarm condition relates to a currently handled alarm condition or a previously handled alarm condition (block 440). For example, the network resolution platform (e.g., using computing resource 224, processor 320, memory 330, storage component 340, and/or the like) may determine, based on correlation rules, whether the alarm condition relates to a currently handled alarm condition or a previously handled alarm condition, as described above in connection with FIGS. 1A-2.

As further shown in FIG. 4, process 400 may include processing the alarm condition, network inventory information, network topology information, and network service information, with a machine learning model and when the alarm condition does not relate to the currently handled alarm condition or the previously handled alarm condition, to correlate the alarm condition with the network inventory information, the network topology information, and the network service information, wherein correlating the alarm condition, with the network inventory information, the network topology information, and the network service information, generates a correlated alarm condition (block 450). For example, the network resolution platform (e.g., using computing resource 224, processor 320, memory 330, and/or the like) may process the alarm condition, network inventory information, network topology information, and network service information, with a machine learning model and when the alarm condition does not relate to the currently handled alarm condition or the previously handled alarm condition, to correlate the alarm condition with the network inventory information, the network topology information, and the network service information, as described above in connection with FIGS. 1A-2. In some implementations, correlating the alarm condition, with the network inventory information, the network topology information, and the network service information, may generate a correlated alarm condition.

As further shown in FIG. 4, process 400 may include automatically generating a resolution for the correlated alarm condition based on correlating the alarm condition with the network inventory information, the network topology information, and the network service information (block 460). For example, the network resolution platform (e.g., using computing resource 224, processor 320, storage component 340, and/or the like) may automatically generate a resolution for the correlated alarm condition based on correlating the alarm condition with the network inventory information, the network topology information, and the network service information, as described above in connection with FIGS. 1A-2.

As further shown in FIG. 4, process 400 may include automatically performing one or more actions based on the resolution for the correlated alarm condition (block 470). For example, the network resolution platform (e.g., using computing resource 224, processor 320, memory 330, communication interface 370, and/or the like) may automatically perform one or more actions based on the resolution for the correlated alarm condition, as described above in connection with FIGS. 1A-2.

Process 400 may include additional implementations, such as any single implementation or any combination of implementations described below and/or described with regard to any other process described herein.

In some implementations, the correlated alarm condition may correlate the alarm condition at a network entity level, across network domains, at a network slice level, and at a network service level. In some implementations, the network resolution platform may update a data structure with information associated with the alarm condition when the alarm condition relates to the currently handled alarm condition or the previously handled alarm condition.

In some implementations, the network resolution platform may process network customer information and the correlated alarm condition, with another machine learning model, to determine an impact of the correlated alarm condition on network customers, and may automatically generate the resolution for the correlated alarm condition based on the impact of the correlated alarm condition on the network customers. In some implementations, the first portion of the network may include a physical network, and the second portion of the network may include a virtual network.

In some implementations, when automatically performing the one or more actions, the network resolution platform may cause a network device of the network to perform differently, may cause a change to a network interface of the network, may cause a virtual network entity to perform differently, may cause a virtual network entity to be replaced with another virtual network entity, may cause routing through the network to change, may reconfigure one or more network devices of the network, may cause a network device to power up or power down, may cause a backup network device of the network to take over for a primary network device of the network, may cause a network technician to be dispatched to address an issue, may cause a network device of the network to be replaced, may cause an order for a network device to be placed to replace a failing network device or a network that is predicted to fail, and/or the like.

In some implementations, the network resolution platform may provide, to a user device associated with a network administrator, information associated with the resolution of the correlated alarm condition to permit the user device to implement the resolution in the network, or may instruct one or more network devices of the network to implement the resolution in the network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
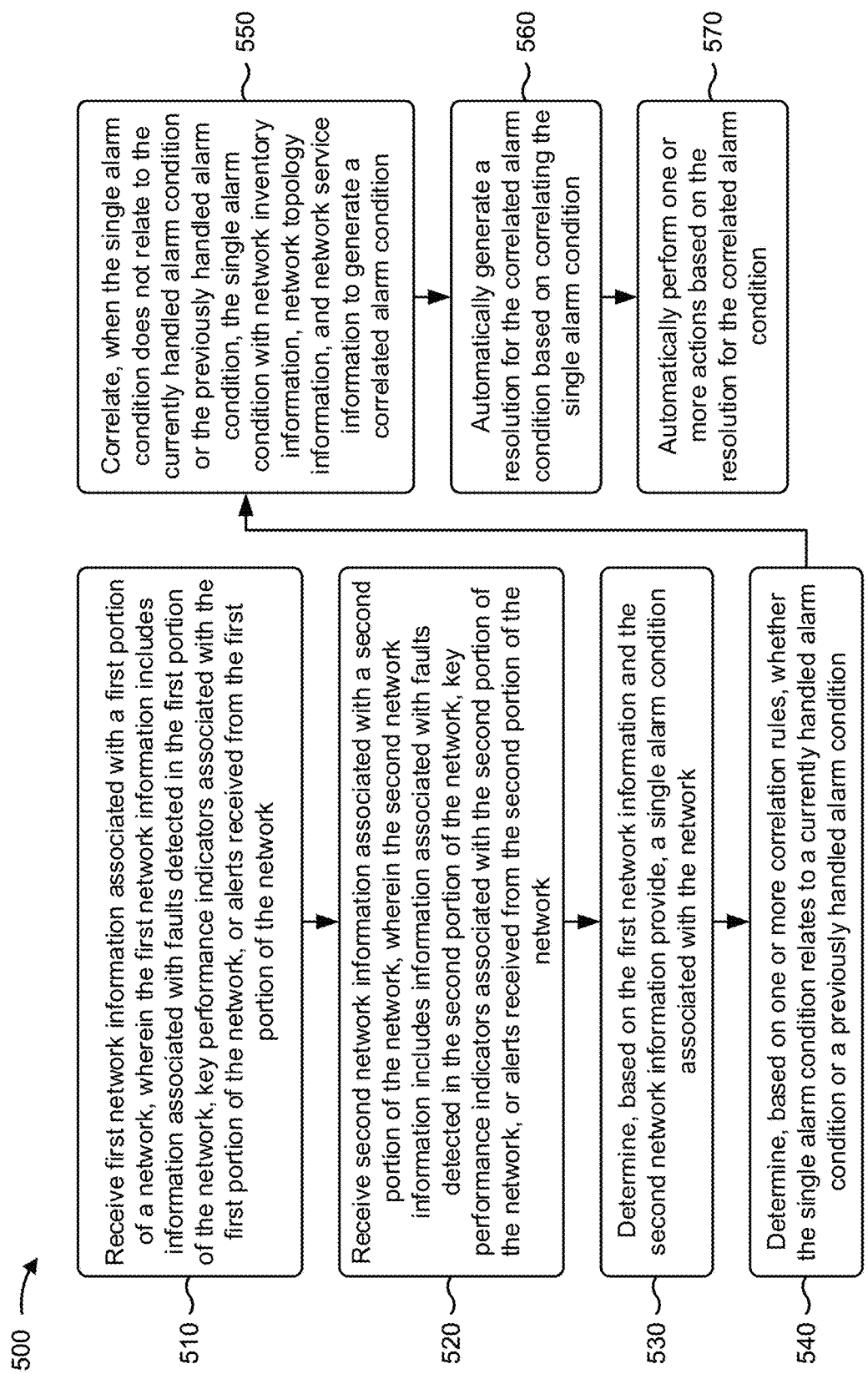

FIG. 5 is a flow chart of an example process 500 for automatic monitoring, correlation, and resolution of network alarm conditions. In some implementations, one or more process blocks of FIG. 5 may be performed by a network resolution platform (e.g., network resolution platform 220). In some implementations, one or more process blocks of FIG. 5 may be performed by another device or a group of devices separate from or including the network resolution platform, such as a user device (e.g., user device 210).

As shown in FIG. 5, process 500 may include receiving first network information associated with a first portion of a network, wherein the first network information includes information associated with faults detected in the first portion of the network, key performance indicators associated with the first portion of the network, or alerts received from the first portion of the network (block 510). For example, the network resolution platform (e.g., using computing resource 224, processor 320, communication interface 370, and/or the like) may receive first network information associated with a first portion of a network, as described above in connection with FIGS. 1A-2. In some implementations, the first network information may include information associated with faults detected in the first portion of the network, key performance indicators associated with the first portion of the network, or alerts received from the first portion of the network.

As further shown in FIG. 5, process 500 may include receiving second network information associated with a second portion of the network that is different than the first portion of the network, wherein the second network information includes information associated with faults detected in the second portion of the network, key performance indicators associated with the second portion of the network, or alerts received from the second portion of the network (block 520). For example, the network resolution platform (e.g., using computing resource 224, processor 320, communication interface 370, and/or the like) may receive second network information associated with a second portion of the network that is different than the first portion of the network, as described above in connection with FIGS. 1A-2. In some implementations, the second network information may include information associated with faults detected in the second portion of the network, key performance indicators associated with the second portion of the network, or alerts received from the second portion of the network.

As further shown in FIG. 5, process 500 may include determining, based on the first network information and the second network information provide, a single alarm condition associated with the network (block 530). For example, the network resolution platform (e.g., using computing resource 224, processor 320, memory 330, and/or the like) may determine, based on the first network information and the second network information provide, a single alarm condition associated with the network, as described above in connection with FIGS. 1A-2.

As further shown in FIG. 5, process 500 may include determining, based on one or more correlation rules, whether the single alarm condition relates to a currently handled alarm condition or a previously handled alarm condition (block 540). For example, the network resolution platform (e.g., using computing resource 224, processor 320, memory 330, storage component 340, and/or the like) may determine, based on one or more correlation rules, whether the single alarm condition relates to a currently handled alarm condition or a previously handled alarm condition, as described above in connection with FIGS. 1A-2.

As further shown in FIG. 5, process 500 may include correlating, when the single alarm condition does not relate to the currently handled alarm condition or the previously handled alarm condition, the single alarm condition with network inventory information, network topology information, and network service information to generate a correlated alarm condition (block 550). For example, the network resolution platform (e.g., using computing resource 224, processor 320, memory 330, and/or the like) may correlate, when the single alarm condition does not relate to the currently handled alarm condition or the previously handled alarm condition, the single alarm condition with network inventory information, network topology information, and network service information to generate a correlated alarm condition, as described above in connection with FIGS. 1A-2.

As further shown in FIG. 5, process 500 may include automatically generating a resolution for the correlated alarm condition based on correlating the single alarm condition with the network inventory information, the network topology information, and the network service information (block 560). For example, the network resolution platform (e.g., using computing resource 224, processor 320, storage component 340, and/or the like) may automatically generate a resolution for the correlated alarm condition based on correlating the single alarm condition with the network inventory information, the network topology information, and the network service information, as described above in connection with FIGS. 1A-2.

As further shown in FIG. 5, process 500 may include automatically performing one or more actions based on the resolution for the correlated alarm condition (block 570). For example, the network resolution platform (e.g., using computing resource 224, processor 320, memory 330, communication interface 370, and/or the like) may automatically perform one or more actions based on the resolution for the correlated alarm condition, as described above in connection with FIGS. 1A-2.

Process 500 may include additional implementations, such as any single implementation or any combination of implementations described below and/or described with regard to any other process described herein.

In some implementations, the correlated alarm condition correlates the single alarm condition at a network entity level for physical network entities and virtual network entities, across a core portion of the network, a transport portion of the network, and an access network portion of the network, at a network slice level, and at a network service level. In some implementations, the network resolution platform may update a data structure with information associated with the single alarm condition when the single alarm condition relates to the currently handled alarm condition or the previously handled alarm condition, where the data structure permits the network to handle the single alarm condition based on the currently handled alarm condition or the previously handled alarm condition.

In some implementations, the network resolution platform may determine an impact of the correlated alarm condition on network customers based on network customer information and the correlated alarm condition, and, when automatically generating the resolution for the correlated alarm condition, the network resolution platform may automatically generate the resolution for the correlated alarm condition based on the impact of the correlated alarm condition on the network customers. In some implementations, the first portion of the network may include a physical network, and the second portion of the network may include a virtual network. In some implementations, the network resolution platform may update a data structure with information associated with the correlated alarm condition and the resolution for the correlated alarm condition.

In some implementations, when automatically performing the one or more actions, the network resolution platform may cause a network device of the network to perform differently, may cause a change to a network interface of the network, may cause a virtual network entity to perform differently, may cause a virtual network entity to be replaced with another virtual network entity, may cause routing through the network to change, may reconfigure one or more network devices of the network, may cause a network device to power up or power down, may cause a backup network device of the network to take over for a primary network device of the network, may cause a network technician to be dispatched to address an issue, may cause a network device of the network to be replaced, may cause an order for a network device to be placed to replace a failing network device or a network that is predicted to fail, and/or the like.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
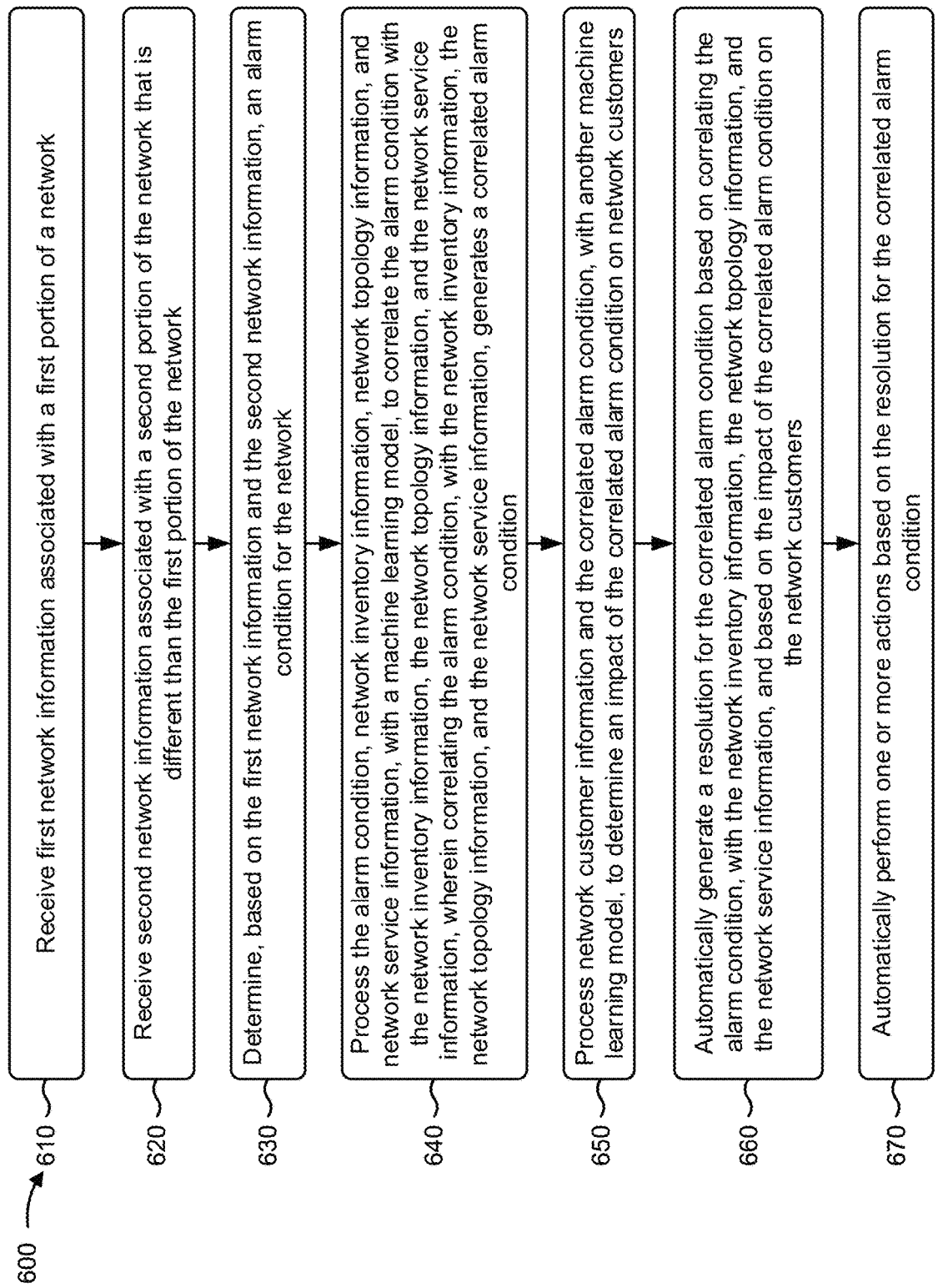

FIG. 6 is a flow chart of an example process 600 for automatic monitoring, correlation, and resolution of network alarm conditions. In some implementations, one or more process blocks of FIG. 6 may be performed by a network resolution platform (e.g., network resolution platform 220). In some implementations, one or more process blocks of FIG. 6 may be performed by another device or a group of devices separate from or including the network resolution platform, such as a user device (e.g., user device 210).

As shown in FIG. 6, process 600 may include receiving first network information associated with a first portion of a network (block 610). For example, the network resolution platform (e.g., using computing resource 224, processor 320, communication interface 370, and/or the like) may receive first network information associated with a first portion of a network, as described above in connection with FIGS. 1A-2.

As further shown in FIG. 6, process 600 may include receiving second network information associated with a second portion of the network that is different than the first portion of the network (block 620). For example, the network resolution platform (e.g., using computing resource 224, processor 320, communication interface 370, and/or the like) may receive second network information associated with a second portion of the network that is different than the first portion of the network, as described above in connection with FIGS. 1A-2.

As further shown in FIG. 6, process 600 may include determining, based on the first network information and the second network information, an alarm condition for the network (block 630). For example, the network resolution platform (e.g., using computing resource 224, processor 320, storage component 340, and/or the like) may determine, based on the first network information and the second network information, an alarm condition for the network, as described above in connection with FIGS. 1A-2.

As further shown in FIG. 6, process 600 may include processing the alarm condition, network inventory information, network topology information, and network service information, with a machine learning model, to correlate the alarm condition with the network inventory information, the network topology information, and the network service information, wherein correlating the alarm condition, with the network inventory information, the network topology information, and the network service information, generates a correlated alarm condition (block 640). For example, the network resolution platform (e.g., using computing resource 224, processor 320, memory 330, and/or the like) may process the alarm condition, network inventory information, network topology information, and network service information, with a machine learning model, to correlate the alarm condition with the network inventory information, the network topology information, and the network service information, as described above in connection with FIGS. 1A-2. In some implementations, correlating the alarm condition, with the network inventory information, the network topology information, and the network service information may generate a correlated alarm condition.

As further shown in FIG. 6, process 600 may include processing network customer information and the correlated alarm condition, with another machine learning model, to determine an impact of the correlated alarm condition on network customers (block 650). For example, the network resolution platform (e.g., using computing resource 224, processor 320, memory 330, storage component 340, and/or the like) may process network customer information and the correlated alarm condition, with another machine learning model, to determine an impact of the correlated alarm condition on network customers, as described above in connection with FIGS. 1A-2.

As further shown in FIG. 6, process 600 may include automatically generating a resolution for the correlated alarm condition based on correlating the alarm condition, with the network inventory information, the network topology information, and the network service information, and based on the impact of the correlated alarm condition on the network customers (block 660). For example, the network resolution platform (e.g., using computing resource 224, processor 320, memory 330, and/or the like) may automatically generate a resolution for the correlated alarm condition based on correlating the alarm condition, with the network inventory information, the network topology information, and the network service information, and based on the impact of the correlated alarm condition on the network customers, as described above in connection with FIGS. 1A-2.

As further shown in FIG. 6, process 600 may include automatically performing one or more actions based on the resolution for the correlated alarm condition (block 670). For example, the network resolution platform (e.g., using computing resource 224, processor 320, storage component 340, communication interface 370, and/or the like) may automatically perform one or more actions based on the resolution for the correlated alarm condition, as described above in connection with FIGS. 1A-2.

Process 600 may include additional implementations, such as any single implementation or any combination of implementations described below and/or described with regard to any other process described herein.

In some implementations, the correlated alarm condition may correlate the alarm condition at a network entity level, across network domains, at a network slice level, and at a network service level. In some implementations, the network resolution platform may update a data structure with information associated with the correlated alarm condition and the resolution for the correlated alarm condition, may receive, after updating the data structure, additional network information indicating the alarm condition for the network, and may utilize the data structure to automatically generate the resolution for the correlated alarm condition.

In some implementations, the network resolution platform may provide, to a user device associated with a network administrator, information associated with the resolution of the correlated alarm condition to permit the user device to implement the resolution in the network. In some implementations, the first portion of the network may include a core portion of the network, and the second portion of the network may include an access network portion of the network.

In some implementations, when automatically performing the one or more actions, the network resolution platform may cause a network device of the network to perform differently, may cause a change to a network interface of the network, may cause a virtual network entity to perform differently, may cause a virtual network entity to be replaced with another virtual network entity, may cause routing through the network to change, may reconfigure one or more network devices of the network, may cause a network device to power up or power down, may cause a backup network device of the network to take over for a primary network device of the network, may cause a network technician to be dispatched to address an issue, may cause a network device of the network to be replaced, may cause an order for a network device to be placed to replace a failing network device or a network that is predicted to fail, and/or the like.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, first network information associated with a first portion of a network;
   receiving, by the device, second network information associated with a second portion of the network that is different than the first portion of the network;
   determining, by the device and based on the first network information and the second network information, an alarm condition for the network;
   determining, by the device and based on correlation rules, whether the alarm condition relates to a currently handled alarm condition or a previously handled alarm condition;
   processing, by the device, the alarm condition, network inventory information, network topology information, and network service information, with a machine learning model and when the alarm condition does not relate to the currently handled alarm condition or the previously handled alarm condition, to correlate the alarm condition with the network inventory information, the network topology information, and the network service information,
      wherein correlating the alarm condition, with the network inventory information, the network topology information, and the network service information, generates a correlated alarm condition;
   automatically generating, by the device, a resolution for the correlated alarm condition based on correlating the alarm condition with the network inventory information, the network topology information, and the network service information; and automatically performing, by the device, one or more actions based on the resolution for the correlated alarm condition.

2. The method of claim 1, wherein the correlated alarm condition correlates the alarm condition at a network entity level, across network domains, at a network slice level, and at a network service level.

3. The method of claim 1, further comprising:
updating a data structure with information associated with the alarm condition when the alarm condition relates to the currently handled alarm condition or the previously handled alarm condition.

4. The method of claim 1, further comprising:
processing network customer information and the correlated alarm condition, with another machine learning model, to determine an impact of the correlated alarm condition on network customers; and
wherein automatically generating the resolution for the correlated alarm condition comprises:
automatically generating the resolution for the correlated alarm condition based on the impact of the correlated alarm condition on the network customers.

5. The method of claim 1, wherein:
the first portion of the network includes a physical network, and
the second portion of the network includes a virtual network.

6. The method of claim 1, wherein automatically performing the one or more actions comprises one or more of:
causing a network device of the network to perform differently,
causing a change to a network interface of the network,
causing a virtual network entity to perform differently,
causing a virtual network entity to be replaced with another virtual network entity,
causing routing through the network to change,
reconfiguring one or more network devices of the network,
causing a network device to power up or power down,
causing a backup network device of the network to take over for a primary network device of the network,
causing a network technician to be dispatched to address an issue,
causing a network device of the network to be replaced, or
causing an order for a network device to be placed to replace a failing network device or a network that is predicted to fail.

7. The method of claim 1, further comprising one of:
providing, to a user device associated with a network administrator, information associated with the resolution of the correlated alarm condition to permit the user device to implement the resolution in the network; or
instructing one or more network devices of the network to implement the resolution in the network.

8. A device, comprising:
one or more memories; and
one or more processors, communicatively coupled to the one or more memories, to:
receive first network information associated with a first portion of a network,
wherein the first network information includes information associated with:
faults detected in the first portion of the network,
key performance indicators associated with the first portion of the network, or
alerts received from the first portion of the network;
receive second network information associated with a second portion of the network that is different than the first portion of the network,
wherein the second network information includes information associated with:
faults detected in the second portion of the network,
key performance indicators associated with the second portion of the network, or
alerts received from the second portion of the network;
determine, based on the first network information and the second network information provide, a single alarm condition associated with the network;
determine, based on one or more correlation rules, whether the single alarm condition relates to a currently handled alarm condition or a previously handled alarm condition;
correlate, when the single alarm condition does not relate to the currently handled alarm condition or the previously handled alarm condition, the single alarm condition with network inventory information, network topology information, and network service information to generate a correlated alarm condition;
automatically generate a resolution for the correlated alarm condition based on correlating the single alarm condition with the network inventory information, the network topology information, and the network service information; and
automatically perform one or more actions based on the resolution for the correlated alarm condition.

9. The device of claim 8, wherein the correlated alarm condition correlates the single alarm condition:
at a network entity level for physical network entities and virtual network entities,
across a core portion of the network, a transport portion of the network, and an access network portion of the network,
at a network slice level, and
at a network service level.

10. The device of claim 8, wherein the one or more processors are further to:
update a data structure with information associated with the single alarm condition when the single alarm condition relates to the currently handled alarm condition or the previously handled alarm condition,
wherein the data structure permits the network to handle the single alarm condition based on the currently handled alarm condition or the previously handled alarm condition.

11. The device of claim 8, wherein the one or more processors are further to:
determine an impact of the correlated alarm condition on network customers based on network customer information and the correlated alarm condition; and
wherein, when automatically generating the resolution for the correlated alarm condition, the one or more processors are to:
automatically generate the resolution for the correlated alarm condition based on the impact of the correlated alarm condition on the network customers.

12. The device of claim 8, wherein:
the first portion of the network includes a physical network, and
the second portion of the network includes a virtual network.

13. The device of claim 8, wherein the one or more processors are further to:
update a data structure with information associated with the correlated alarm condition and the resolution for the correlated alarm condition.

14. The device of claim 8, wherein, when automatically performing the one or more actions, the one or more processors are to one or more of:
cause a network device of the network to perform differently,
cause a change to a network interface of the network,
cause a virtual network entity to perform differently,
cause a virtual network entity to be replaced with another virtual network entity,
cause routing through the network to change,
reconfigure one or more network devices of the network,
cause a network device to power up or power down,
cause a backup network device of the network to take over for a primary network device of the network,
cause a network technician to be dispatched to address an issue,
cause a network device of the network to be replaced, or
cause an order for a network device to be placed to replace a failing network device or a network that is predicted to fail.

15. A non-transitory computer-readable medium storing instructions, the instructions comprising:
one or more instructions that, when executed by one or more processors of a device, cause the one or more processors to:
receive first network information associated with a first portion of a network;
receive second network information associated with a second portion of the network that is different than the first portion of the network;
determine, based on the first network information and the second network information, an alarm condition for the network;
process the alarm condition, network inventory information, network topology information, and network service information, with a machine learning model, to correlate the alarm condition with the network inventory information, the network topology information, and the network service information,
wherein correlating the alarm condition, with the network inventory information, the network topology information, and the network service information, generates a correlated alarm condition;
process network customer information and the correlated alarm condition, with another machine learning model, to determine an impact of the correlated alarm condition on network customers;
automatically generate a resolution for the correlated alarm condition based on correlating the alarm condition, with the network inventory information, the network topology information, and the network service information, and based on the impact of the correlated alarm condition on the network customers; and
automatically perform one or more actions based on the resolution for the correlated alarm condition.

16. The non-transitory computer-readable medium of claim 15, wherein the correlated alarm condition correlates the alarm condition at a network entity level, across network domains, at a network slice level, and at a network service level.

17. The non-transitory computer-readable medium of claim 15, wherein the instructions further comprise:
one or more instructions that, when executed by the one or more processors, cause the one or more processors to:
update a data structure with information associated with the correlated alarm condition and the resolution for the correlated alarm condition;
receive, after updating the data structure, additional network information indicating the alarm condition for the network; and
utilize the data structure to automatically generate the resolution for the correlated alarm condition.

18. The non-transitory computer-readable medium of claim 15, wherein the instructions further comprise:
one or more instructions that, when executed by the one or more processors, cause the one or more processors to:
provide, to a user device associated with a network administrator, information associated with the resolution of the correlated alarm condition to permit the user device to implement the resolution in the network.

19. The non-transitory computer-readable medium of claim 15, wherein:
the first portion of the network includes a core portion of the network, and
the second portion of the network includes an access network portion of the network.

20. The non-transitory computer-readable medium of claim 15, wherein the one or more instructions, that cause the one or more processors to automatically perform the one or more actions, cause the one or more processors to one or more of:
cause a network device of the network to perform differently,
cause a change to a network interface of the network,
cause a virtual network entity to perform differently,
cause a virtual network entity to be replaced with another virtual network entity,
cause routing through the network to change,
reconfigure one or more network devices of the network,
cause a network device to power up or power down,
cause a backup network device of the network to take over for a primary network device of the network,
cause a network technician to be dispatched to address an issue,
cause a network device of the network to be replaced, or
cause an order for a network device to be placed to replace a failing network device or a network that is predicted to fail.

* * * * *